US007802066B2

(12) United States Patent
Paladini et al.

(10) Patent No.: US 7,802,066 B2
(45) Date of Patent: *Sep. 21, 2010

(54) ADVANCED MEMORY MANAGEMENT ARCHITECTURE FOR LARGE DATA VOLUMES

(75) Inventors: Gianluca Paladini, Skillman, NJ (US); Thomas Moeller, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 392 days.

This patent is subject to a terminal disclaimer.

(21) Appl. No.: 11/312,856

(22) Filed: Feb. 8, 2006

(65) Prior Publication Data

US 2006/0123215 A1    Jun. 8, 2006

Related U.S. Application Data

(63) Continuation of application No. 10/636,434, filed on Aug. 7, 2003, now Pat. No. 7,032,088.

(51) Int. Cl.
*G06F 12/00* (2006.01)
(52) U.S. Cl. .................. 711/158; 711/203; 711/159; 711/154; 711/170; 711/E12.03; 710/56
(58) Field of Classification Search ............. 711/170, 711/203, 158, 159, E12.03
See application file for complete search history.

(56) References Cited

U.S. PATENT DOCUMENTS

| 4,821,185 A | * | 4/1989 | Esposito ...................... 710/52 |
| 5,717,893 A | | 2/1998 | Mattson |
| 6,552,723 B1 | * | 4/2003 | Duluk et al. ................ 345/419 |

FOREIGN PATENT DOCUMENTS

CN    1427342 A    7/2003

OTHER PUBLICATIONS

Swanson et al. titled "Increasing TLB Reach Using Superpages Backed by Shadow Memory," Publication date: Jun. 1998.
Kosch et al. titled "Vorlesung aus betrlebssystemen, Kapitel 9. Swapping und Virtueller Speicher," Publication date: Apr. 26, 2003.

* cited by examiner

*Primary Examiner*—Jasmine Song
*Assistant Examiner*—Victor W Wang
(74) *Attorney, Agent, or Firm*—Donald B. Paschburg; F. Chau & Associates, LLC

(57) ABSTRACT

An efficient memory management method for handling large data volumes, comprising a memory management interface between a plurality of applications and a physical memory, determining a priority list of buffers accessed by the plurality of applications, providing efficient disk paging based on the priority list, ensuring sufficient physical memory is available, sharing managed data buffers among a plurality of applications, mapping and unmapping data buffers in virtual memory efficiently to overcome the limits of virtual address space.

11 Claims, 7 Drawing Sheets

ADVANCED MEMORY MANAGEMENT ARCHITECTURE FOR LARGE DATA VOLUMES

CROSS REFERENCE TO RELATED APPLICATION

This is a continuation application of Ser. No. 10/636,434 now U.S. Pat. No. 7,032,088, filed Aug. 7, 2003, the disclosure of which is herein incorporated by reference in their entirety.

BACKGROUND OF THE INVENTION

1. Field of the Invention

The present invention relates to data processing, and more particularly to a virtual memory management system and method for handling large data volumes.

2. Discussion of the Related Art

Applications for visualizing three-dimensional volume data utilize memory intensive methods such as ray-casting, splatting, and shear-warp. The volume data visualized by these methods can be obtained from medical tomographic scanners such as Magnetic Resonance (MR), Computed Tomography (CT), Positron Emission Tomography (PET), or any other apparatus capable of producing a series of slices in a grid-like array. Many volume visualization methods are implemented using a programmed computer, and rely on the computer's virtual memory and virtual paging system for storing and accessing slice data. Personal computers available today typically use operating systems such as Windows NT, Windows XP, Unix, or Linux. Such operating systems employ methods of virtual memory addressing and virtual paging. The performance of virtual memory addressing and virtual paging in a programmed computer decreases considerably when memory is allocated for a very large number of slices of a large three-dimensional volume and the total memory allocated is larger than the available Random-Access Memory (RAM) of the programmed computer, also known as physical memory. Such a decrease in the performance of virtual memory addressing and virtual paging also causes a substantial decrease in the performance of volume visualization methods.

Memory limitation have been exacerbated by recent technological advances in the field of tomographic imaging, which have improved the spatial resolution and speed of data acquisition, resulting in the production of very large datasets comprising hundreds, and even thousands of slices. For example, it is possible to rapidly generate a sequence of 1024 slices using the Siemens SOMATOM VolumeZoom™ CT scanner, with each slice comprising a grid of 512×512 picture elements, resulting in a three-dimensional volume of 512×512×1024 volume elements (over 268 million data values). In the Oil and Gas industry, seismic data measurements are also stored in very large three-dimensional volumes, with as many as 2048×2048×2048 grid elements (over 8.5 billion data values). These types of data can be larger than the Random-Access Memory (RAM) storage available on modern computers. Some three-dimensional arrays can be so large that their size exceeds the memory addressing capability of 32-bit Central Processing Units (CPU) found in many personal computers and graphic workstations, which is typically limited to a maximum of 4.2 billion data elements.

One limitation of conventional virtual paging methods available in the art is that they are designed to be general-purpose, and their performance is not optimized for handling a large number of slices of a three-dimensional volume efficiently. When the Random-Access Memory of a computer becomes overloaded with too many slice buffers, the probability that the virtual paging system will page out to disk portions of slice memory buffers that may be needed shortly thereafter by the volume visualization method increases, and can cause a continuous page-in/page-out effect that dramatically decreases the computer's processing performance. This problem is commonly known as "disk thrashing".

For example, the Windows XP Virtual Memory Manager begins paging memory to disk only when all the physical memory is used up (i.e. when there is no more memory available). Under such low memory conditions, all applications become highly unresponsive because the operating system is busy paging memory segments in and out of disk. Since each paged segment is only 64 Kilobytes, it takes a long time to recover from low-memory conditions.

Further, the Windows XP Virtual Memory Manager has no knowledge of which image data buffers are being actively used and which are not, and therefore it tries to keep them all in memory until all the physical memory is saturated. When paging image data to disk, it has no knowledge of whether that data will be soon needed again, and therefore it can be highly inefficient.

Another limitation is in the virtual memory addressing capability of 32-bit CPUs, which address about 4.2 billion byte elements. In some virtual memory addressing systems one of the 32 address bits is reserved for kernel memory of the operating system, and therefore the remaining address space available for virtual memory allocation is reduced by half, that is about 2.1 billion byte elements. Thus, the size of the virtual memory can be exceeded: for example, a three-dimensional volume of seismic data with 2048 slice buffers each with 2048×2048 grid elements, would require over 8.5 billion byte elements of storage, exceeding the virtual memory addressing capabilities of a 32-bit CPU. If multiple large volumes need to be allocated, the limited number of virtual memory addresses for slice buffers also becomes problematic.

As shown above, applications that process large data volumes are difficult for computers to serve, due to the limited amounts of physical memory, limited virtual address space, and inefficiencies in the operating system's virtual memory management and swap file.

Therefore, a need exists for an efficient memory management method for handling large data volumes.

SUMMARY OF THE INVENTION

According to an embodiment of the present invention, a method of managing a memory system for large data volumes comprises a central memory management system providing an interface between a plurality of applications and the physical memory of a programmed computer.

The method further comprises maintaining a global priority list of memory buffers allocated by a plurality of applications as a linked-list, wherein the list is sorted by when each buffer was last accessed by an application. The priority list maps data of the storage device to buffers of a virtual memory, wherein the buffers of the virtual memory are paged-in to physical memory as they are requested by the plurality of applications.

The method comprises specifying a low physical memory limit, and monitoring the amount of usable physical memory, and upon determining that the usable physical memory falls below the low physical memory limit, paging-out least-recently used slice buffers from the physical memory, through the memory management interface, increasing the usable physical memory to about a specified high physical memory limit.

The method further comprises determining an unused data buffer in a virtual address space of the memory system coupled to the physical memory, marking the unused data buffer, and recovering a virtual address space by unmapping the unused data buffer from the virtual address space upon detecting that a programmed computer is allocating more virtual memory than a computer processor can address.

The method further comprises sharing data buffers stored in the physical memory, through the memory management interface, among a plurality of applications, wherein the data buffers contain shared data, and determining the priority list of buffers accessed by the plurality of applications, wherein the priority list maps the data buffers to a storage device.

The method comprises identifying, uniquely, a given data buffer according to the contained shared data, wherein a creating application that creates the given data buffer assigns an identifier, and determining whether the identifier has been previously assigned to a shared data buffer, and upon determining that the identifier already exists in the physical memory, giving the creating application access to the shared data buffer.

The method comprises addressing an object pointing to a data buffer in a central memory management system directly with a memory address from within an application using the central memory management system, and validating the memory address using a key, wherein the key comprises unique information and is known to both a sender and a receiver of the object. The method comprises providing a unique handle, combining the memory address and the handle in a fast-retrieval handle, sharing the fast-retrieval handle among two or more applications, and determining whether an object identified by the fast-retrieval handle is valid upon accessing the object.

Maintaining the global priority list further comprises adding an object to the global priority list corresponding to a data buffer upon creation of the data buffer, and removing the object from the global priority list upon determining the data buffer pointer corresponding to the object has been deleted, wherein the object's parent object and child object in the global priority list are linked prior to removing the object. Maintaining the list further comprises moving the object to an end of the list upon determining that the object is to be used, wherein the object at the end of the global priority list is less likely to be flushed than an object at a beginning of the global priority list. The method comprises notifying the plurality of applications of a buffer address change due to memory unmapping or mapping operations.

According to an embodiment of the present invention, a memory management system comprises one or more storage devices for storing paging files, a priority linked-list coupled to the storage devices, wherein nodes of the priority linked-list are associated with the paging files of the storage devices, and a virtual memory space comprising a plurality of data buffers, each data buffer coupled to a unique node of the priority linked-list.

According to an embodiment of the present invention, a memory management system either interfaces with a plurality of applications directly, or is coupled to a central image processing server which in turn provides an interface between at least one application and the memory management system.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
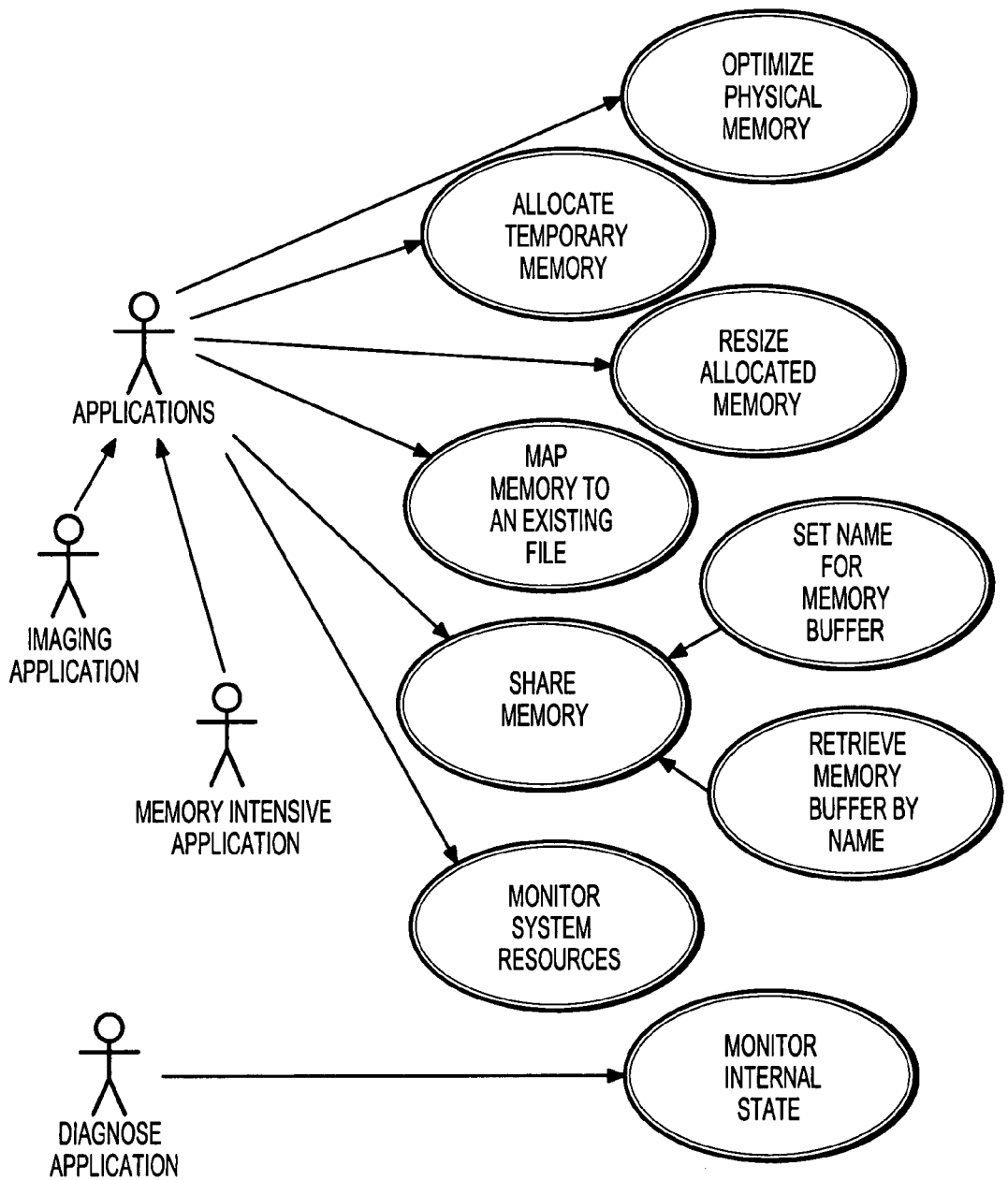
FIG. 1 is a diagram showing typical use cases regarding memory usage of an image processing application.
Figure 2:
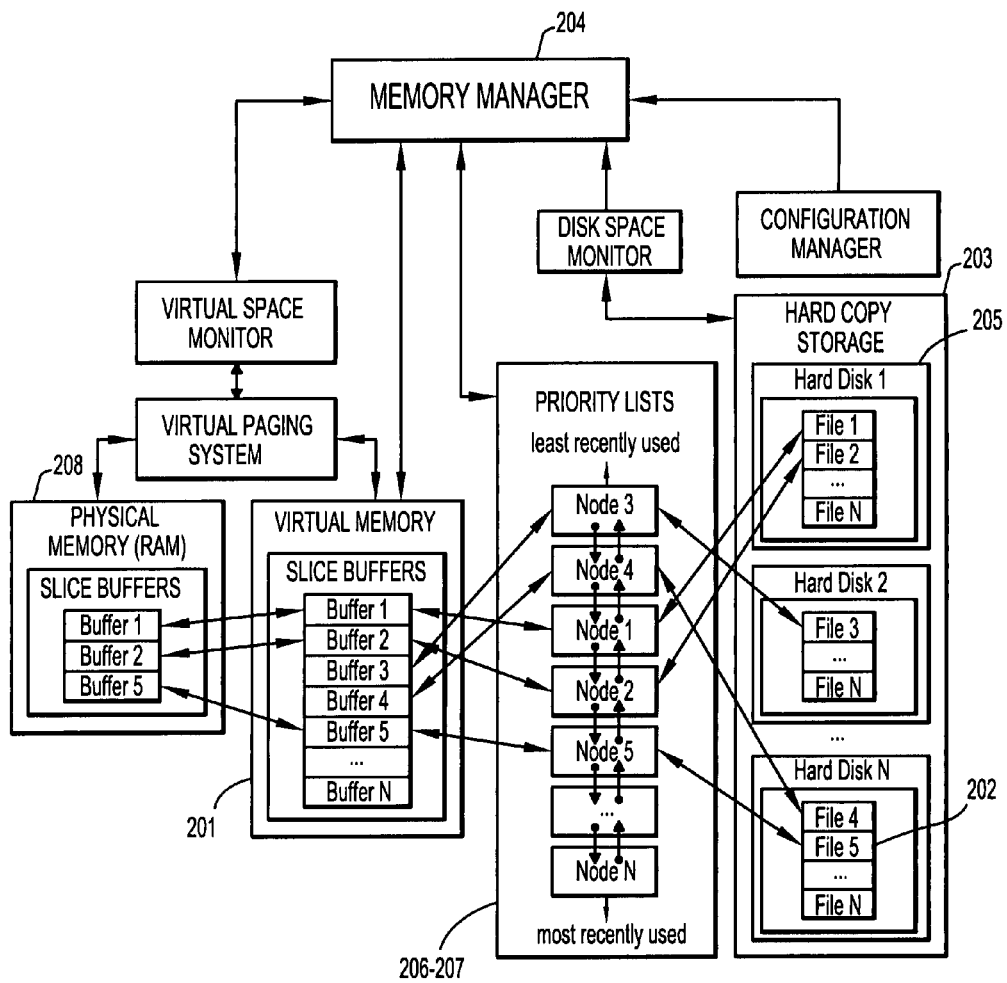
FIG. 2 is a diagram visualizing a relationship between physical, virtual and hard disk memory and its management through a priority linked-list in a memory management system according to an embodiment of the present invention.

According to an embodiment of the present invention, computer memory is efficiently managed, wherein the memory is allocated for a data volume. A method of managing memory is disclosed by way of an example in terms of an imaging application for the storage and visualization of two-dimensional slices and three-dimensional volumes comprising such slices. Referring to FIG. 2, a series of memory buffers 201 is allocated for each two-dimensional slice. The data contained in each memory buffer can be obtained, for example, from medical tomographic scanners such as Magnetic Resonance (MR), Computed Tomography (CT), Positron Emission Tomography (PET), or any other apparatus capable of producing a series of slices in a grid-like array. Each memory buffer or slice buffer has its own virtual paging file, e.g., 202, which can be paged-in from or paged-out to a storage device 203. The storage device can be, for example, a magnetic hard-disk device. A memory manager 204 can create and access multiple virtual paging files on multiple storage devices, e.g., 205, maximizing the storage capacity of a programmed computer implementing the memory manager 204.

According to an embodiment of the present invention, the effective performance of an existing virtual memory paging system and magnetic hard disk apparatus of the programmed computer is improved by utilizing a global linked-list 206 that keeps track of the most-recently used and the least-recently used two-dimensional slice buffers 201. When the programmed computer accesses the data of a slice buffer, the memory manager 204 determines whether a usable amount of Random Access Memory (RAM) 207 of the programmed computer has fallen below a predefined low limit. If so, a set of least-recently used memory buffers are paged-out to the storage device, e.g., a hard-disk device, until a predefined amount of usable RAM is recovered. Thus, the computer memory is prevented from becoming overloaded, allowing the efficient visualization of three-dimensional volumes comprising a very large number of slices.

Applications that manipulate large amounts of data can request more resources from the programmed computer than is practical for efficient operation. For example, image-processing applications exist that allow a user to create any desired number of Raster and Bitplane objects of various sizes. A large number of these objects can quickly use up all the available physical memory (e.g., RAM memory), forcing a virtual memory manager, such as the Windows XP Virtual Memory Manager, to continuously swap memory segments to disk, greatly degrading a system's performance. According to an embodiment of the present invention, employing a memory management architecture for the allocation of memory buffers prevents low-memory conditions and maintains a desirable level of performance and interactivity. The memory management architecture can be implemented with any object type. Object types can exhibit grouping, dependencies/relationships, notifications, or other high-level functionalities.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
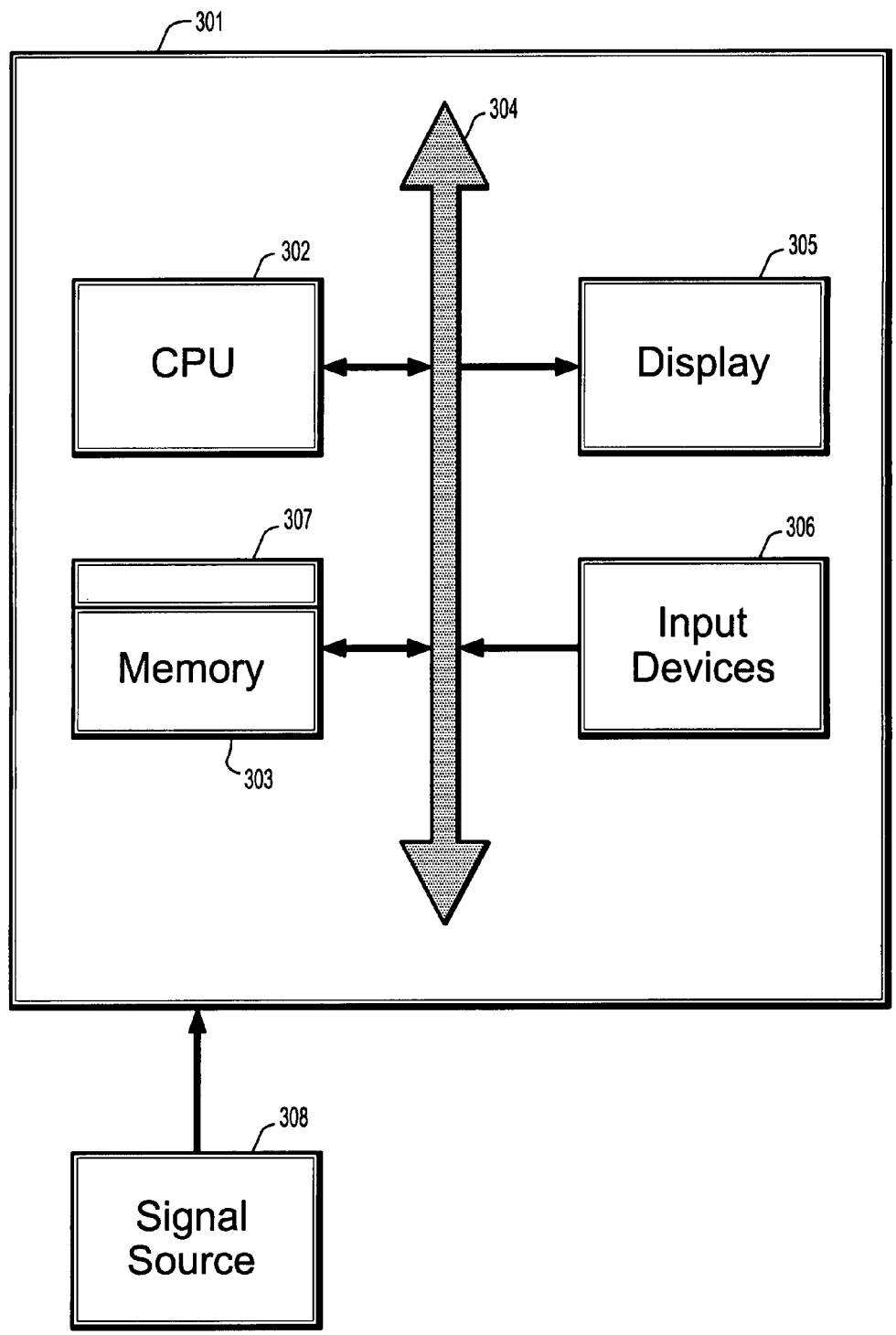
FIG. 3 is a diagram of a system according to an embodiment of the present invention.

Referring to FIG. 3, according to an embodiment of the present invention, a computer system 301 for implementing the present invention can comprise, inter alia, a central processing unit (CPU) 302, a memory 303, and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 4:
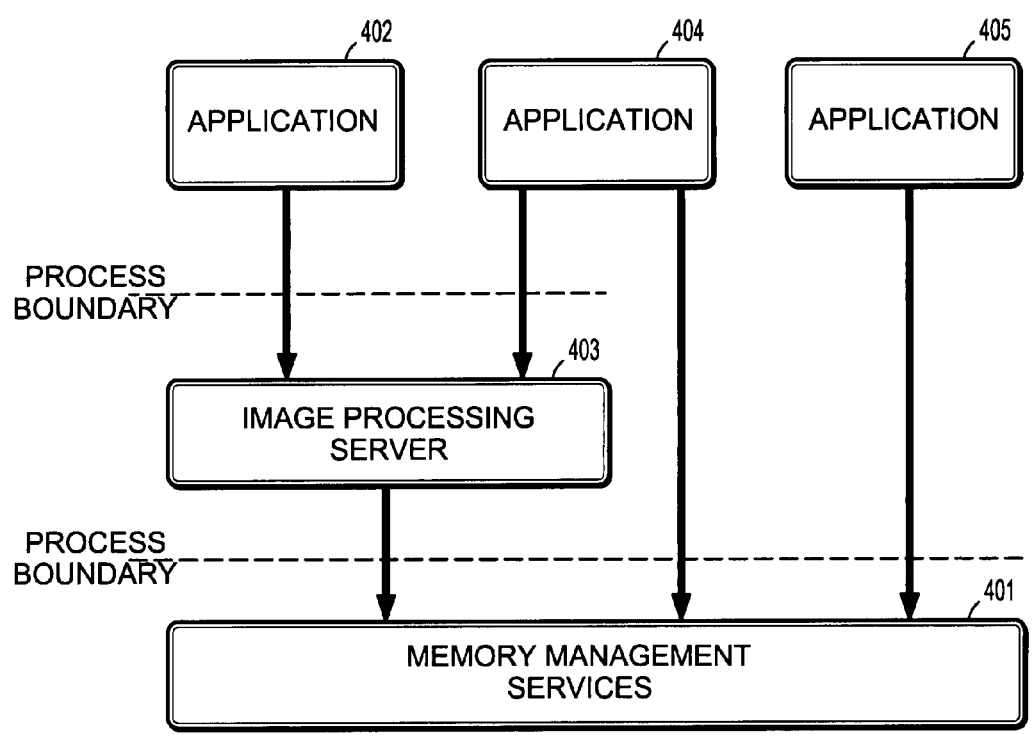
FIG. 4 is a diagram of a system implementing memory management according to an embodiment of the present invention.

Referring to FIG. 4, a memory management system 401 can support multiple applications (402, 404, 405) simultaneously. That is, the memory management system 401 serves multiple instances of a memory library. The applications can interface directly with the memory management system 401 and/or through another layer, such as a library server 403.

A method of managing a memory system comprises sharing data buffers stored in a physical memory among a plurality of applications, wherein the data buffers contain shared data. The memory manager has knowledge of all the shared data buffers stored in the physical memory. The method comprises identifying a given data buffer according to the contained shared data, wherein a creating application that creates the given data buffer assigns an identifier. The identifier is unique to the data of the data buffer; therefore, if two applications attempt to create a data buffer for the same data, the same identifier will be generated. The method comprises determining whether the identifier has been previously assigned to a shared data buffer, and upon determining that the identifier already exists in the physical memory, giving the creating application access to the shared data buffer.

According to an embodiment of the present invention, a MemoryMap object type and a MemoryManager object type are provided.

The MemoryMap object allocates memory using a memory-mapped buffer. Memory-mapped buffers can be used just like any other memory buffer, for example allocated with malloc or new functions of the C-language runtime, but in addition memory-mapped buffers offer other advantages.

Instead of being backed by the default operating system's swap file, each memory-mapped buffers is backed by a temporary paging file, which can be specified programmatically. This makes it possible to allocate more memory than what could fit into a typical operating system swap file. The MemoryMap objects also allow temporary files to be created on different disks, wherein the total allocated memory can be as high as the sum of all the free disk space available on multiple disks, e.g., several Gigabytes.

A memory-mapped buffer can be shared between different processes and/or applications. This is important to the transfer of data between processes in a client-server architecture, e.g., see FIG. 5, without having to make additional copies of the data.

Unlike other memory buffers (for example, those that are allocated with malloc or new), memory-mapped buffers according to an embodiment of the present invention can be flushed out of physical memory programmatically.

Referring again to the imaging application example, when creating Raster or Bitplane objects, internally the image data is stored in an instance of the MemoryMap object type, which allocates a memory-mapped image buffer. A set of Configuration Parameters (for example, provided by an operating system) allow the specification of parameters such as how many disks should be used for memory-mapping, how much space can be used on each disk, and the pathname where the temporary paging files should be created.

An instance of the MemoryManager object is responsible for monitoring the available free physical memory, and for flushing least recently used memory-mapped buffers to disk when approaching low-memory conditions. Thus, the MemoryManager object can keep track of which image buffers are actively being used and which image buffers have not being used recently. By using the knowledge of the active and/or inactive buffers, the MemoryManager object can be selective about which buffers should be flushed to disk, providing greater paging efficiency than can be achieved using, for example, the Windows NT virtual memory manager.

The MemoryManager object can page an entire memory-mapped image buffer to disk at once, providing additional free physical memory.

The MemoryManager object can continue flushing until a desired memory size, e.g., several Megabytes, have been paged to disk. Therefore, the period between low-memory conditions can be increased.

The MemoryManager object can flush memory-mapped buffers out of physical memory before all memory is saturated, maintaining sufficient memory such that applications have a desirable response time.

A set of configuration parameters allow for the specification of a minimum amount of free physical memory before buffers are flushed, and an amount of physical memory to be recovered upon flushing the buffers.

Figure 5:
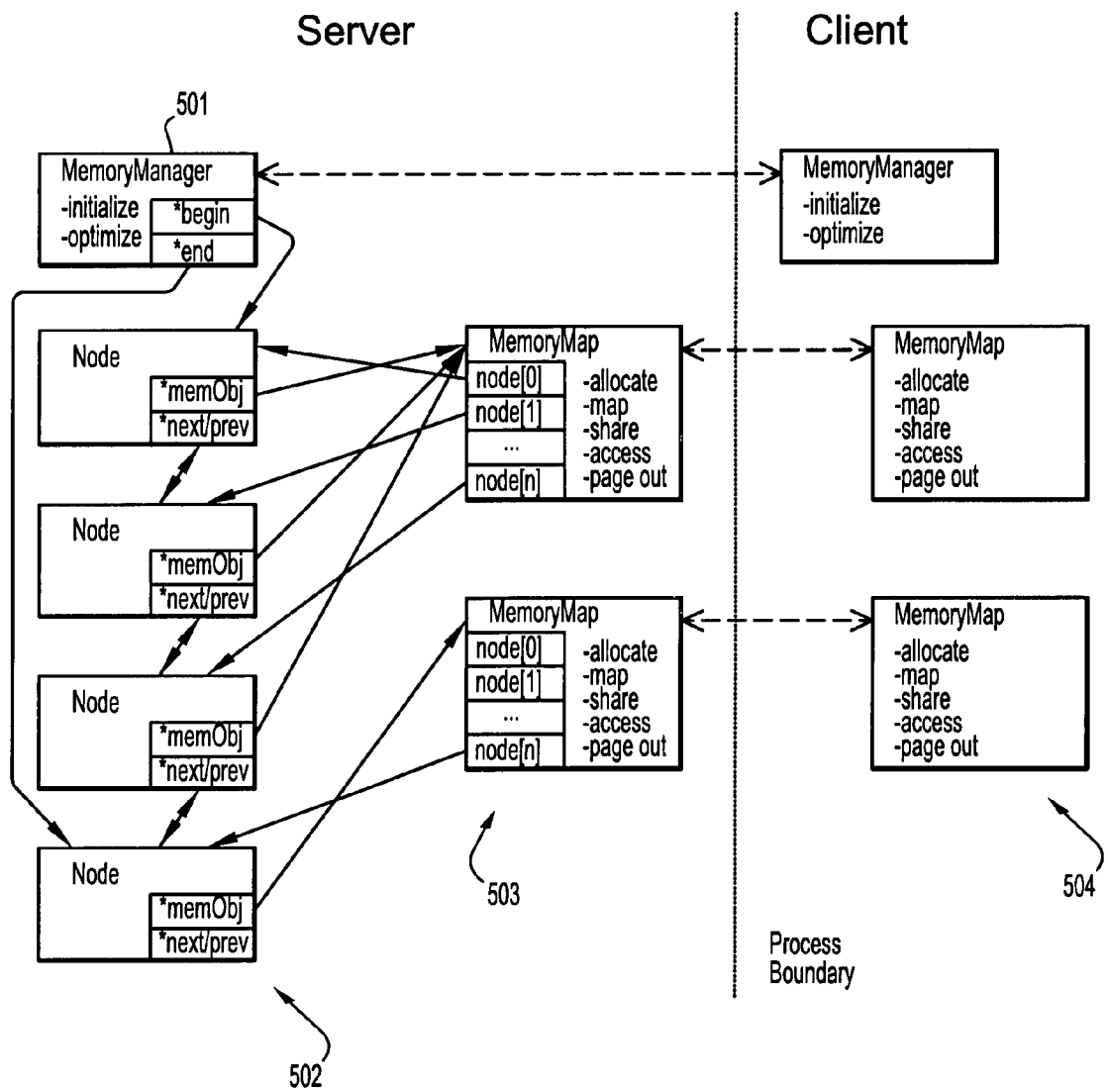
FIG. 5 is an illustration of an application server architecture according to an embodiment of the present invention.

Referring to FIG. 5, the MemoryManager object 501 comprises a linked-list 502 of all the MemoryMap objects, 503 and 504, created by the client image processing application(s). The linked-list 502 is maintained in a sorted order, so that the least recently used buffers can always be found at the beginning of the list (e.g., items that should be flushed first), while the most recently used buffers are found at the end of the list (e.g., items that should be flushed last).

Methods for keeping linked-lists in sorted order are highly efficient, and need little overhead. The linked-list does not need to be re-arranged by a sorting operation, the only operations involved are appending or moving items at the end of the list. The linked-list is maintained sorted by implementing the following procedures:

- Whenever an image buffer is created, a newly allocated MemoryMap object adds itself to the end of the list, since it is more likely to be used soon.
- Whenever an image buffer pointer is deleted, its corresponding MemoryMap object removes itself from the list, joining its parent link with its child link. Therefore the list does not need to be traversed when deleting an item.
- Whenever an image buffer is about to be used, its corresponding MemoryMap object is moved to the end of the list, so that it is less likely to be flushed. Then the total free physical memory is checked, and if it falls below a certain threshold the first item in the list is flushed to disk, and moved at the end of the linked-list as well.

These procedures are sufficient to guarantee that actively used image buffers, as well as buffers which have just been flushed, are at the end of the list. The remaining items at the beginning of the list are always the least recently used buffers. It should be understood that other methods of maintaining a linked-list are contemplated, and that one of ordinary skill in the art would appreciate that these others methods can be implemented. For example, a most-frequently used linked-list.

The MemoryMap object allows the application to lock a buffer while it is accessed. This information is stored in a flag corresponding to the buffer accessible to the MemoryManager object. Therefore, the MemoryManager knows which buffers are currently used by the image processing application according to the flags. Using a flag that indicates if a buffer is used, the MemoryManager object can un-map currently unused memory-mapped buffers to reduce the footprint on the application's virtual address space. This optimization takes place when a new buffer is requested that does not fit into the available virtual address space of the image processing application, is transparent to the application itself and allows addressing of more data than natively supported by the processors architecture, for example, 2 Gigabytes.

When the MemoryManager object un-maps a buffer from the virtual address space of the application and maps it back later when the buffer is accessed again the address within the virtual address space may be different from the initially assigned address when the buffer was created. For this reason, an application needs to be programmed not to maintain memory-mapped buffer addresses past the lifetime of a corresponding object, as they can become invalid. However, according to an embodiment of the present invention, any application using memory-mapped buffers through a MemoryMap object can be notified whenever a buffer's address has been changed due to mapping operations, so that the application can maintain up to date data addresses.

Figure 6:
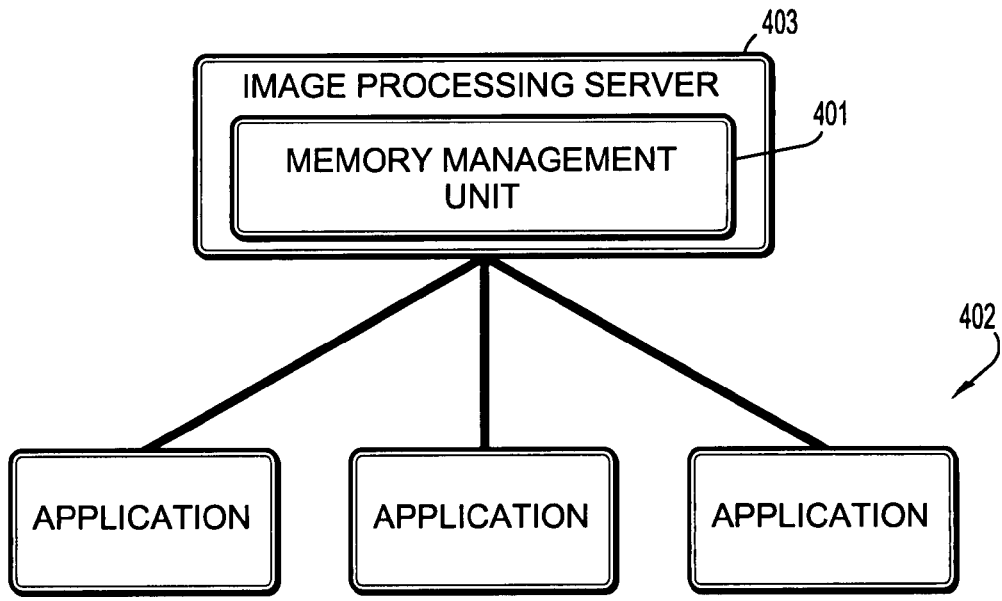
FIG. 6 is a diagram of a memory management system for a plurality of applications according to an embodiment of the present invention.
Figure 7:
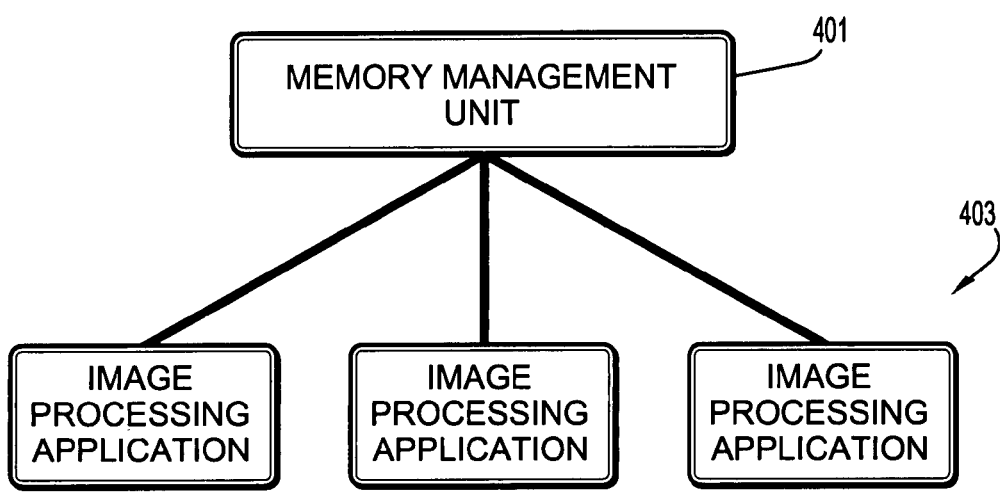
FIG. 7 is a diagram of a memory management system for a plurality of applications according to an embodiment of the present invention.

The Memory Management embodiment described previously is also applicable to parallel running image processing applications as shown in FIGS. 6 and 7. Parallel running applications use a central instance of the MemoryManager object 401 that manages a linked-list of all memory-mapped buffers for all applications. The decision about which buffers to flush to optimize the available physical memory is done based on this global list. Once the oldest buffers have been selected to be flushed out of physical memory, all applications holding a reference to those buffers are notified. Thus, the flushing command needs to be issued by all applications that share this buffer.

Figure 8:
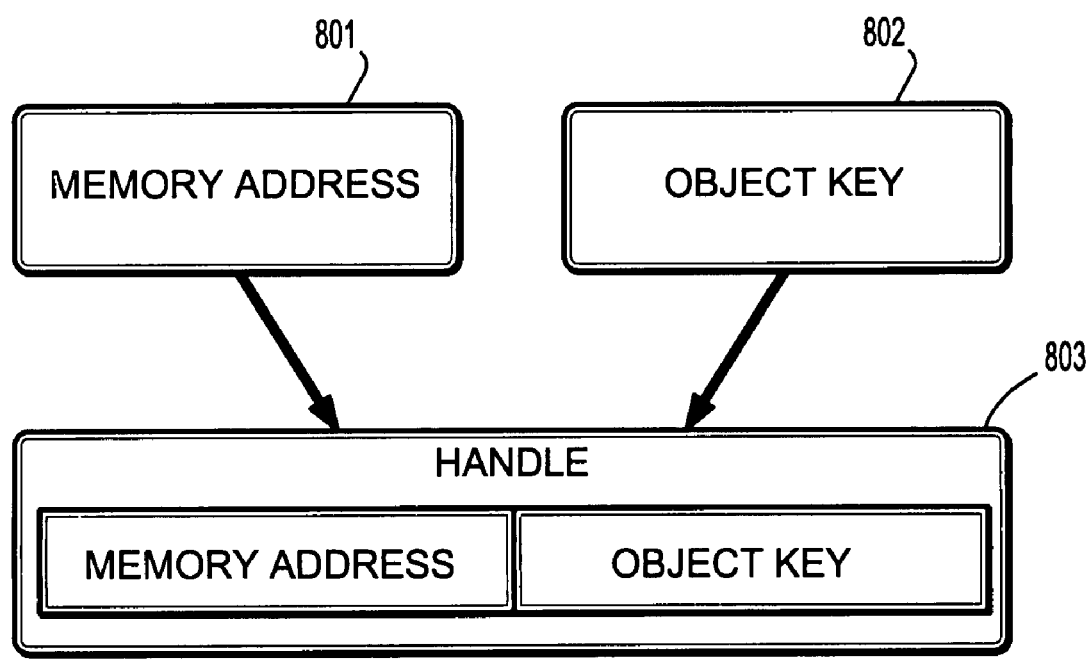
FIG. 8 is a diagram of a fast-retrieval handle that combines object address and system memory-mapping handle used in the embodiment of a central service memory management system according to an embodiment of the present invention.

Exchanging address references of the MemoryMap object instances between the centralized Memory Management and the applications is needed to allow direct access without additional list traversals or lookups. However, accessing these addresses directly carries the risk of access violations in case where an object instance is destroyed in the meantime. An embodiment of the Memory Management for parallel image processing applications can combine the MemoryMap object address 801 with a system memory-mapping handle 802 to validate the integrity of the memory address 801 as shown in FIG. 8. Once the retrieval handle 803 is received by the application, the address pointer 801 is only validated if the attached system memory-mapping handle 802 can be found at the given address as well.

While addressing remote objects indirectly via identifiers causes additional overhead in managing the list of identifiers and specifically in traversing it each time an objects needs to be addressed, the additional overhead can be reduced or eliminated by addressing an object directly with its memory address across applications and validating the memory address using a key. The key provides additional information that varies from object to object and is known to both sender and receiver. On a remote side the object's key needs to be stored within the remote object's memory address, for example, as a class member variable or field in object oriented programming languages. When an object is deleted this key is overridden with a default value, for example, using the class destructor in object oriented programming languages. Combining the object's memory address 801 with the key 802 into a single unit or retrieval-handle 803 allows for direct addressing of remote objects across logical or physical boundaries in a safe fashion. Before accessing the memory address that is stored within the retrieval-handle 803, the remote side determines whether the key 802 from the retrieval-handle 803 can also be found at the given memory address 801. This is only the case for objects whose lifetime did not yet expire.

The key 802 can be any sufficiently unique alphanumeric value, for example, sequential numbers, randomly generated numbers or resource handles of system resources associated with an object.

Having described embodiments for a virtual memory system and method for handling large data volumes, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A memory management system comprising:
a storage device for storing paging files;
a global priority linked-list coupled to the storage device, wherein nodes of the global priority linked-list are associated with the paging files of the storage devices; and
a virtual memory space comprising a plurality of data buffers, each data buffer coupled to a unique node of the global priority linked-list,
wherein the memory management system is coupled to a central image processing server providing an interface between at least one application and the memory management system, and maintains a global priority list of data buffers allocated by the at least one application, wherein the global priority list is sorted according to an order in which data buffers are accessed by the at least one application and flushing, programmatically, selected data buffers of the plurality of data buffers out of a physical memory upon determining a specified low amount of free physical memory.

2. The system of claim 1, comprising two or more storage devices.

3. A program storage device embodying a program of instructions executable by a processor to perform method steps for managing a memory system for data volumes, the method steps comprising:
providing a central memory management system comprising a memory management interface between a plurality of applications and a physical memory of a programmed computer; and
maintaining a global priority linked-list of data buffers allocated by the plurality of applications, wherein the list is sorted according to an order in which data buffers are accessed by the plurality of applications.

4. The method of claim 3, wherein the global priority linked-list maps data of a storage device to data buffers of a virtual memory, wherein the data buffers of the virtual memory are paged-in to physical memory as they are requested by the plurality of applications.

5. The method of claim 3, further comprising:
specifying a low physical memory limit; and
monitoring an amount of usable physical memory, and upon determining that the usable physical memory falls below the low physical memory limit, paging-out least-recently used memory buffers from the physical memory, through the memory management interface, increasing the usable physical memory to about a specified high physical memory limit.

6. The method of claim 3, further comprising:
determining an unused data buffer in a virtual address space of the memory system coupled to the physical memory;
marking the unused data buffer; and
recovering a virtual address space by unmapping the unused data buffer from the virtual address space upon detecting that the programmed computer is allocating more virtual memory than a computer processor can address.

7. The method of claim 3, further comprising:
sharing data buffers stored in the physical memory, through the memory management interface, among the plurality of applications, wherein the data buffers contain shared data; and
determining the global priority linked-list of buffers accessed by the plurality of applications, wherein the global priority linked-list maps the data buffers to a storage device.

8. The method of claim 3, further comprising:
identifying, uniquely, a given data buffer according to contained shared data therein, wherein a creating application that creates the given data buffer assigns an identifier; and
determining whether the identifier has been previously assigned to a shared data buffer, and upon determining that the identifier already exists in the physical memory, giving the creating application access to the shared data buffer.

9. The method of claim 3, further comprising:
addressing an object pointing to a data buffer in the central memory management system directly with a memory address from within an application using the central memory management system; and
validating the memory address using a key, wherein the key comprises unique information and is known to both a sender and a receiver of the object.

10. The method of claim 3, wherein maintaining the global priority linked-list further comprises:
adding an object to the global priority linked-list corresponding to a data buffer upon creation of the data buffer;
removing the object from the global priority linked-list upon determining the data buffer pointer corresponding to the object has been deleted, wherein the object's parent object and child object in the global priority linked-list are sorted prior to removing the object; and
moving the object to an end of the list upon determining that the object is to be used, wherein the object at the end of the global priority linked-list is less likely to be flushed than an object at a beginning of the global priority linked-list.

11. The method of claim 6, further comprising notifying the plurality of applications of a buffer address change due to memory unmapping or mapping operations.

* * * * *